United States Patent [19]
Ando

[11] Patent Number: 4,880,090
[45] Date of Patent: Nov. 14, 1989

[54] HYDRAULIC CONTROLLING SYSTEM FOR LOCKUP CLUTCHES

[75] Inventor: Masahiko Ando, Anjo, Japan

[73] Assignee: Aisin-Warner Kabushiki Kaisha, Aichi, Japan

[21] Appl. No.: 60,697

[22] Filed: Jun. 11, 1987

[51] Int. Cl.[4] .............................................. F16H 45/02
[52] U.S. Cl. ..................................................... 192/3.3
[58] Field of Search ................................. 192/3.3, 3.29

[56] References Cited

U.S. PATENT DOCUMENTS

| | | | |
|---|---|---|---|
| 3,977,502 | 8/1976 | Chana | 192/3.3 |
| 4,428,467 | 1/1984 | Hiramatsu | 192/3.58 X |
| 4,466,311 | 8/1984 | Hiramatsu | 74/866 |
| 4,468,988 | 9/1984 | Hiramatsu | 74/868 |
| 4,589,537 | 5/1986 | Nishikawa et al. | 192/3.3 X |
| 4,662,488 | 5/1987 | Hiramatsu et al. | 74/866 X |
| 4,664,235 | 5/1987 | Yokoyama et al. | 192/3.29 |

FOREIGN PATENT DOCUMENTS

184763 9/1985 Japan ..................................... 192/3.3

Primary Examiner—Rodney H. Bonck
Attorney, Agent, or Firm—Varndell Legal Group

[57] ABSTRACT

A lockup control valve is provided to control the discharge from the lockup clutch during clutch engagement and a solenoid valve to supply the control pressure to the lockup control valve. The aforesaid lockup control valve has a face on which the oil supply pressure acts during lockup clutch engagement, an opposing face of equal area on which the lockup clutch discharge pressure acts, a face on which the supply pressure from the aforesaid solenoid valve acts, and an opposing face on which a constant pressure acts. The hydraulic controlling system controls the discharge pressure of the lockup clutch during lockup clutch engagement according to the control pressure from the solenoid valve. This maintains a constant relationship between the solenoid pressure and the lockup clutch capacity (pressure difference) and permits precise slip control even if the oil pressure supplied to the lockup clutch fluctuates.

13 Claims, 10 Drawing Sheets

HYDRAULIC CONTROLLING SYSTEM FOR LOCKUP CLUTCHES

BACKGROUND OF THE INVENTION

The invention relates to a lockup clutch hydraulic control system for fluid couplings having a lockup clutch, which enables slip control.

In the conventional practice, a lockup clutch is provided in the fluid coupling between the engine and transmission, such as a torque converter, for engaging and disengaging in accordance with automatic transmission curves for each gear, which directly connects the engine output to the transmission under certain conditions.

Consequently, if the current throttle setting and vehicle speed lie in the torque converter region of the automatic transmission curve, the lockup clutch disengages and the engine output is transmitted to the transmission via the torque converter. Conversely, if the current throttle setting and vehicle speed lie in the lockup clutch region of the automatic transmission curve, the lockup clutch engages and the engine output is transmitted directly to the transmission. However, when the lockup clutch is engaged, engine torque and speed fluctuations are directly transmitted to the transmission and propeller shaft, causing to vibration and noise problems.

Figure 9:
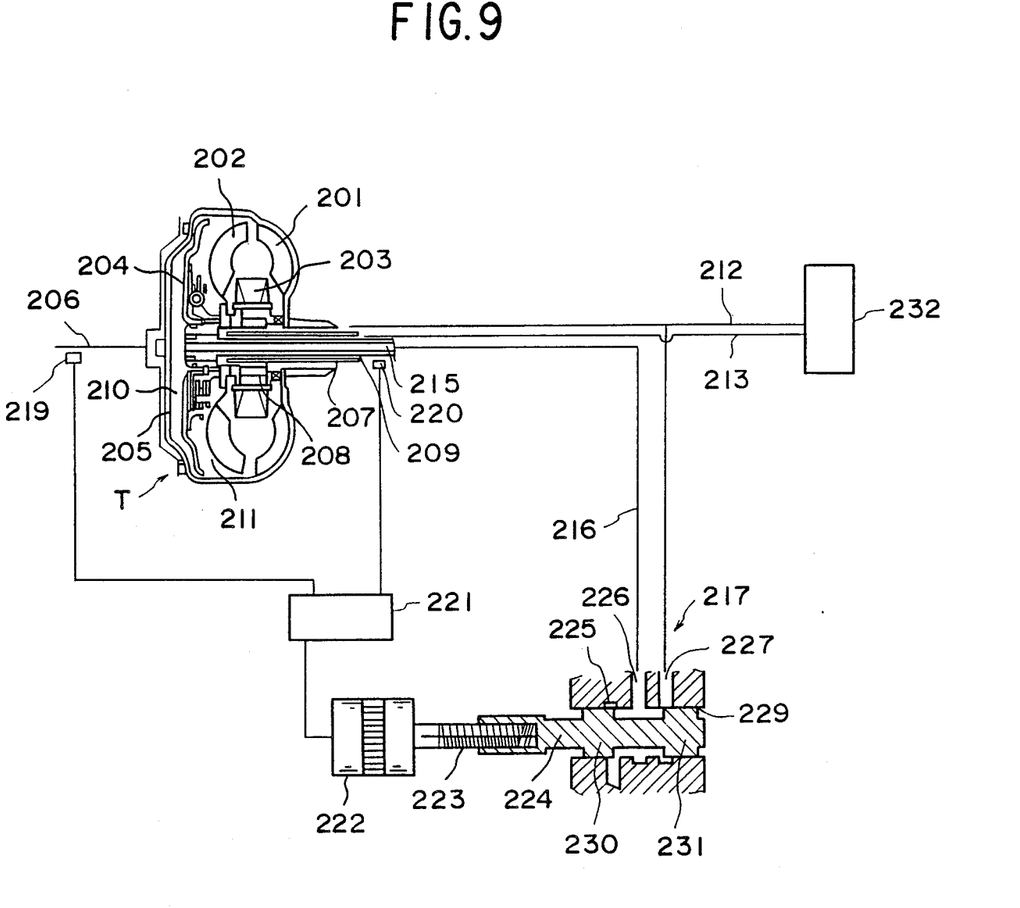
FIG. 9 and FIG. 10 show conventional types of torque converter hydraulic controlling devices.

A known solution to this problem is to permit torque transmission with a certain amount of slip of the lockup clutch, i.e., with the lockup clutch in a semi-engaged state. This system is shown in FIG. 9, where T is a torque converter; 201 is an impeller; 202 a turbine; 203 a stator; 204 a lockup clutch; 205 a cover shell; 206 a power input shaft; 207 a fixed shaft; 208 a one-way clutch; 209 a power output shaft; 210 a release chamber; 211 an apply chamber; 212 an oil-supply circuit; 213 an oil-discharge circuit; 215 an axial oil path; 216 an oil path; 217 a lockup control valve; 219, 220 rotational speed detectors; 221 a computer; 222 a pulse motor; 223 a rotating shaft; 224 a spool; 225, 226, 227 ports, 229 a spool bore; 230, 231 lands; 232 the regulator valve.

The torque converter T contains the impeller 201, the turbine 202, the stator 203 and the lockup clutch 204. The impeller 201 is welded to the cover shell 205 and the cover shell 205 is connected to the power input shaft 206. In addition, the stator 203 is supported through the one-way clutch 208 by the fixed shaft 207, which is fixed to the torque converter casing. The turbine 202 is splined to the output shaft 209, such that the two rotate together, and the lockup clutch 204 is provided between the turbine 202 and the cover shell 205. The interior of the torque converter T is divided into two chambers, the release chamber 210 and the opposing apply chamber 211 by the lockup clutch 204. Oil is supplied to the apply chamber 211 from the oil-supply circuit 212 and discharged through the oil-discharge circuit 213, so that oil pressure continuously acts on the torque converter T. The release chamber 210 is connected to the lockup control valve 217 via the axial oil path 215 in the output shaft 209 and the oil path 216.

Rotational speed detectors 219, 220, which are connected to the computer 221, are provided on the power input shaft 206 and power output shaft 209. The pulse motor 222 is also connected to the computer 221, and the male thread on the pulse motor rotating shaft 223 screws into the female thread on the spool 224 of the lockup control valve 217. The lockup control valve 217 comprises of spool bore 229 with three ports 225, 226, 227, and the spool 224 with two lands 230, 231. Port 225 is the drain port; 226 is connected to the release chamber 210 by the oil path 216; and port 227 is connected to the oil-supply circuit 212, which connects the apply chamber 211 to the regulator valve 232. The distance between the lands 230 and 231 on the spool 224, is formed to provide a small oil path between the ports 225 and 227.

The principle of operation of the system is as follows. At times when a high torque is required, such as when the vehicle starts moving, the computer 221 operates the pulse motor 222, in such a way that the spool 224 moves to the right, when viewed as shown in FIG. 9. This connects the ports 226 and 227 so that the same oil pressure is applied to both the release chamber 210 and apply chamber 211, and the lockup clutch 204 disengages.

During normal vehicle traveling, the 222 pulse motor keeps the spool 224 in approximately the position shown in FIG. 9. In this position, a small amount of oil is discharged from port 225 so that the oil pressure at port 226 is lower than that at port 227. As a result the oil pressure in the release chamber 210 is lower than that in the apply chamber 211, and the pressure difference between the two chambers pushes the lockup clutch 204 against the cover shell 205. During normal traveling, the signals from the rotational speed detectors 219, 220 are input into the computer 221, which calculates the speed ratio (power output shaft speed/power input shaft speed) between the power input shaft 206 and power output shaft 209. If this calculated ratio exceeds a prescribed value, the computer 221 sends a signal to the 222 pulse motor, which turns and forces the spool 224 a little to the right, reducing the amount of oil discharged from the port 225. Consequently, the pressure in the release chamber 210 rises and the slip between the lockup clutch 204 and the cover shell 205 increases, reducing the speed ratio. Conversely, if the speed ratio becomes too small, the spool 224 moves to the left, increasing the amount of oil discharged from port 225 and decreasing the slip between the lockup clutch 204 and the cover shell 205. Thus it is possible to maintain a prescribed speed ratio. If the vehicle speed exceeds a prescribed value, the spool 224 is forced to the left, connecting port 225 and port 226, discharging all oil from the release chamber 210, so that the lockup clutch 204 and the cover shell 205 are fully engaged.

Figure 10:
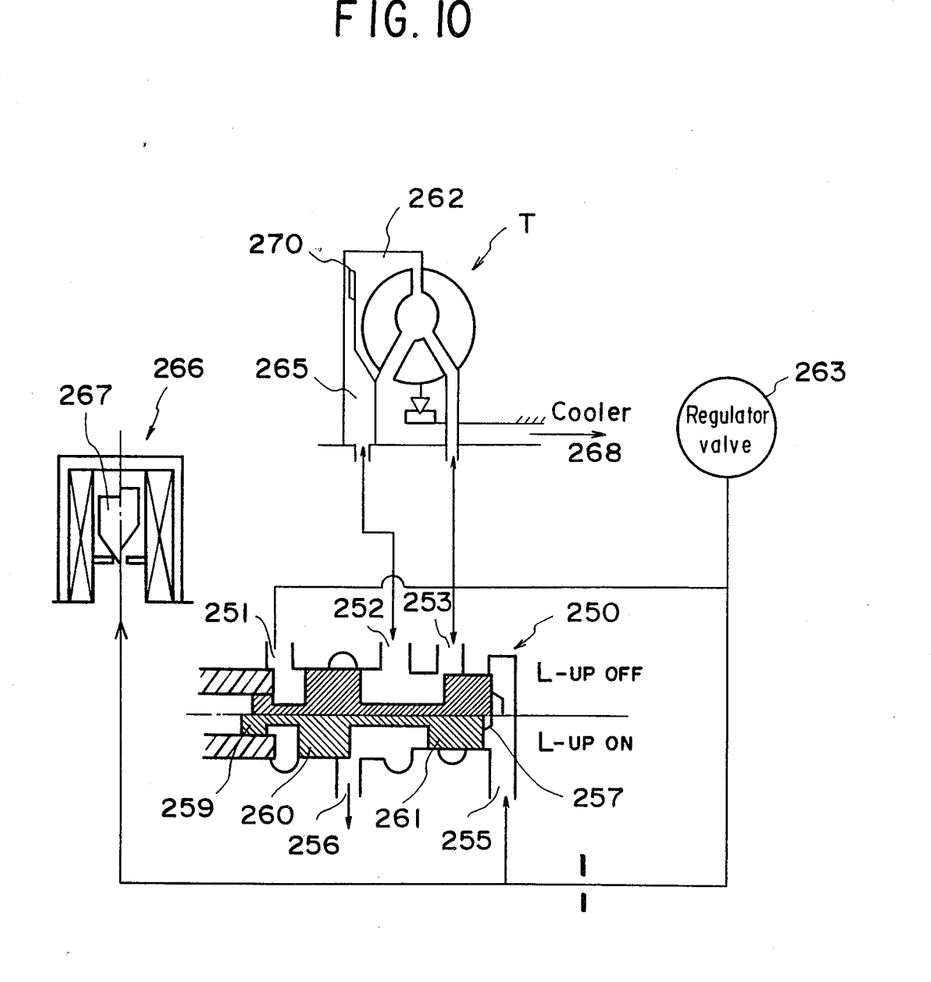

This conventional approach uses a pulse motor to control the lockup control valve; but another method is also available, controlled by a solenoid, as shown in FIG. 10.

In this case, the lockup control valve 250 has ports 251, 252, 253, 255, 256, and the spool 257 has lands 259, 260, 261. Line pressure is supplied to ports 251, 253, 255 and the torque converter T apply chamber 262 via the regulator valve 263. Port 252 is connected to the release chamber 265 and port 256 is connected to the drain. The relationship of the external diameters D1, D2, D3, of the lands 259, 260, 261 of the spool 257 is: $D2 > D3 > D1$. In addition, the solenoid 266 is computer controlled, such that the needle valve 267 is forced out when the control signal is ON, closing off the line pressure drain circuit. Conversely, when the control signal is OFF, the needle valve 267 is withdrawn, opening the drain circuit. The ON-OFF control signal sent to the solenoid valve 266 is a 50 Hz signal, and by increasing the proportion of time that the signal is ON, the time the drain circuit is closed increases, so that the pressure at port 255 rises. Conversely, if the proportion of time that the signal is OFF is increased, the time the drain circuit is open increases and the pressure at port 255 does not rise.

This system operates as follows. In the torque converter region, the solenoid 266 is controlled so that the proportion of OFF time is increased and the amount of drain oil increases so that there is virtually no pressure rise at port 255 of the lockup control valve 250. Consequently, due to the difference in areas on which pressure acts of the lands 259, 260, 261 of spool 257, the spool 257 is forced to the right, closing the port 256 and connecting ports 252 and 253, and disengaging the lockup clutch 270. In this state, oil is discharged from oil-discharge circuit 268.

In the slip region (clutch semi-engaged) the computer controls the proportion of time that the solenoid 266 is ON such that the pressure at port 255 rises to a prescribed value. This prescribed pressure forces the spool 257 to the left so that land 260 opens port 256. When port 256 opens a small amount, the oil pressure between lands 252 and 253 is bled off and the spool 257 then moves back to the right. This process repeats, resulting in a high-frequency reciprocating oscillation of the spool 257 in the vicinity of port 256. This reciprocating oscillation intermittently opens and closes the oil-discharge circuits ports 252, 256 and the oil-supply circuits ports 252, 253, so that the pressure at port 252, ie. in the release chamber 265, is controlled to be lower than the pressure in the apply chamber 262, and the lockup clutch 270 slip is maintained at a constant level.

In the lockup region, the proportion of time that the solenoid 266 is ON is increased, decreasing the amount of oil drained from the solenoid 266, so that the pressure at port 255 of the lockup control valve 250 increases to a prescribed level. Spool 257 is forced to the left by this pressure, fully opening the path between the port 252 and the port 256, discharging the oil from the release chamber 265 and fully engaging the lockup clutch 270.

These two conventional approaches control the pressure difference across the lockup clutch to control the clutch slip by controlling the discharge pressure with a pulse motor or solenoid. Another control system exists, whereby the discharge pressure is connected to the drain and the oil supply pressure to the clutch is controlled.

In conventional systems, which employ a pulse motor or solenoid to control the discharge pressure, problems with unstable slip control occur because the relation between the solenoid pressure and the pressure difference acting across the lockup clutch valve is not constant unless the supply pressure to the lockup clutch is maintained constant. These systems have a problem that an oil pressure of 5–6 kg/cm$^2$ must be supplied to the lockup clutch in order to transmit the maximum engine torque. Engine efficiency is reduced due to the waste in maintaining this high oil pressure under low-load conditions and detrimental structural effects are given on the torque converter.

In addition, in systems whereby the discharge is connected directly to the drain and the supply pressure on the lockup clutch is controlled, the discharge pressure is 0, when the torque is decreased so that the pressure applied to the clutch can drop too low if the torque decreases, leading to cavitation and pressure-instability problems.

SUMMARY OF THE INVENTION

The object of the invention is to overcome the problems described above and to permit stable and precise slip control of the lockup clutch, even in cases where there is fluctuation of the oil pressure supplied to the lockup clutch.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

In order to achieve the objects above, the invention employs a lockup clutch located inside the fluid coupling, a lockup control valve to control the oil discharge pressure when the lockup clutch is engaged, and a solenoid valve to supply the control pressure to the lockup control valve. The lockup control valve contains equal and opposing faces on which the supply pressure to the lockup clutch and the discharge pressure from the lockup clutch act when the lockup clutch is engaged; a face on which the pressure from the solenoid valve acts and an opposing face on which a constant pressure acts, whereby the lockup clutch discharge pressure is controlled by the pressure from the solenoid valve; and in addition, the lockup control valve can select the oil pressure supplied to the lockup clutch.

The invention permanently maintains a constant relationship between the solenoid pressure and the lockup clutch capacity (pressure difference), whereby accurate slip control is possible, even in cases where there is a fluctuation in the pressure supplied to the lockup clutch. Furthermore, the control device is simplified and the cost reduced as no software compensation for supply pressure fluctuations is required. The system is structurally advantageous to the torque converter as the lockup supply pressure may be reduced when the engine is operating under low-load conditions, and the reduced oil-pump drive power contributes to improving vehicle fuel consumption. The good matching of the solenoid duty ratio and lockup capacity permits transmission slip control which permits shock control and busy shift protection, without complex feedback control.

DESCRIPTION OF THE PREFERRED EMBODIMENT

The following describes example applications, referring to the drawings.

Figure 7:
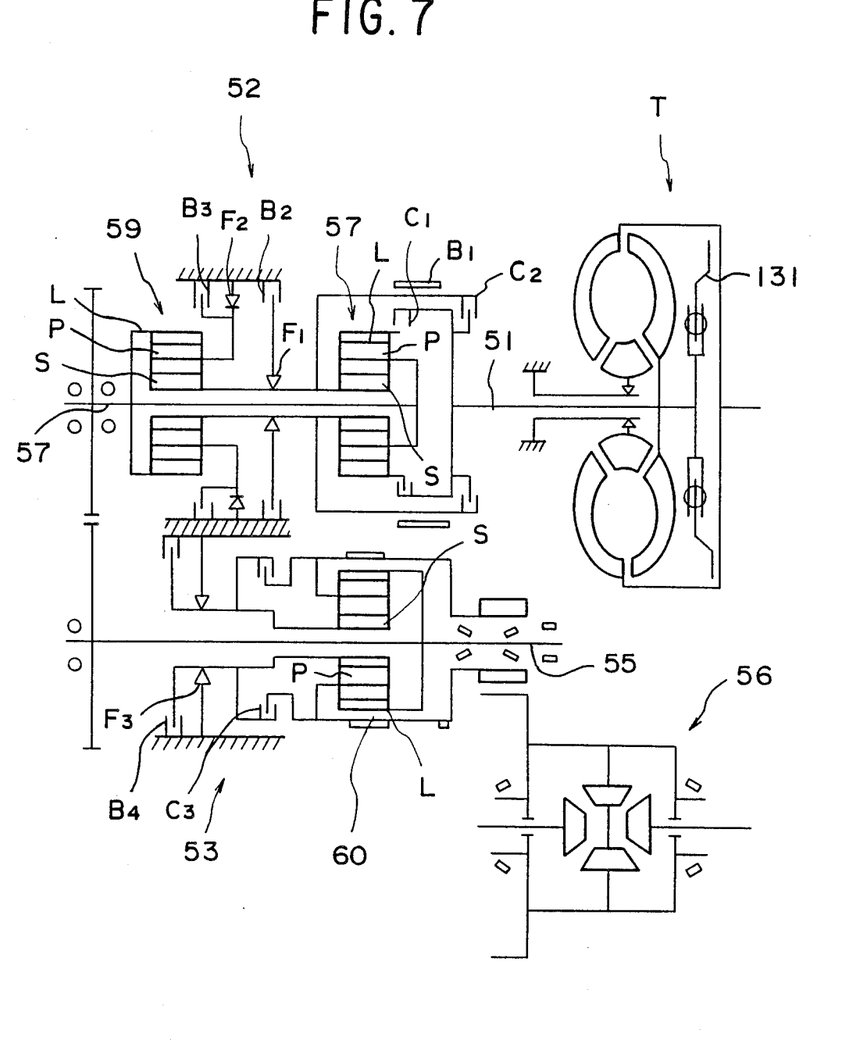
FIG. 7 is a schematic diagram of the power transmission line of an automatic transmission to which the hydraulic controlling device of the invention is applied.

FIG. 7 shows an example of the application of the invention with a fluid-type automatic transmission with overdrive. The automatic transmission comprises of a torque converter T having a lockup clutch 131; a gear transmission 52 capable of switching between three forward speed ranges and a reverse range, connected to the torque converter power output shaft 51; an overdrive unit 53, connected in parallel with the gear transmission; and a differential gear 56, connected to the output shaft 55 of the overdrive unit 53.

The No. 1 planetary gear unit 57 and No. 2 planetary gear unit 59 are located between the torque converter T output shaft 51 and the gear transmission output shaft 50. The No. 3 planetary gear unit 60 is connected to the output shaft 55 of the overdrive unit 53. The planetary gear units 57, 59, 60 comprise of a sun gear S, a ring gear L, planetary gears P, a one-way clutch F1, F2, F3 and friction devices to engage, disengage and lock the component parts, ie. multiple-plate clutches C1, C2, C3, handbrake B1 and a multiple-plate brake B2, B3, B4. As described hereafter, the engaging of combinations of the friction devices enables the switching between three forward speed ranges, a reverse range and overdrive.

Figure 8:
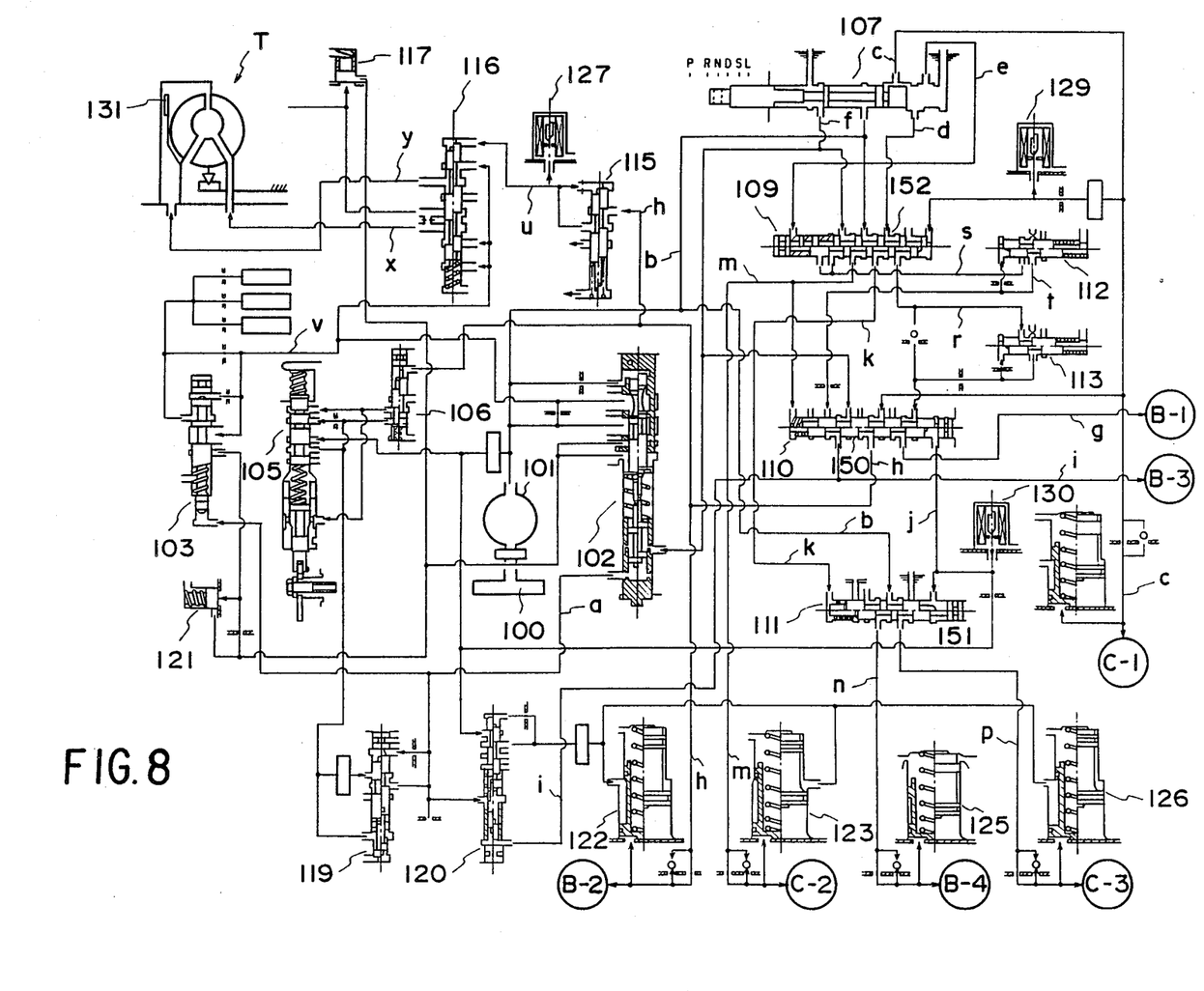
FIG. 8 shows the entire hydraulic control circuit for the hydraulic controlling device of the invention applied to an automatic transmission.

FIG. 8 shows the entire hydraulic control circuit for the automatic transmission described above;

The circuit comprises of an oil reservoir 100, an oil pump 101, a primary pressure regulator valve 102, a secondary pressure regulator valve 103, a throttle valve 105, a cut-back valve 106, a manual valve 107, a 2-3 shift valve 109, a 1-2 shift valve 110, a 3-4 shift valve 111, a low coast modulator valve 112, a second coast modulator valve 113, a lockup modulator valve 115, a lockup control valve 116, a cooler bypass valve 117, a throttle modulator valve 119, an accumulator control valve 120, a discharge pressure relief valve 121, accumulators 122, 123, 125, 126, solenoids 127, 129, 130, clutch pressure servos C-1, C-2, C-3, brake pressure servos B-1, B-2, B-3, B-4, a lockup clutch 131, a torque converter T, oil paths between valves and devices, orifices, flow control valves with check valves and oil strainers.

The principle of operation of the system is as follows. Operating oil pumped out of the oil reservoir 100 by means of the oil pump 101 is adjusted to a prescribed oil pressure by means of the primary pressure regulator valve 102 and is supplied to oil path a and oil path b. Operating oil fed from the oil path a to the secondary pressure regulator valve 103 is adjusted to the predetermined torque converter pressure, lubricant pressure and cooler pressure, according to the throttle pressure in the throttle valve 105. The manual valve 107, which is connected to the oil path b is selectively displaced to the P (parking), R (reverse), N (neutral), D (drive), S (second) or L (low) positions according to the speed range set by manual operation of the gear lever, to connect the oil path b to oil paths c, d, e, f, as shown in the table below. ("O" indicates a connection.)

TABLE 1

|  | P | R | N | D | S | L |
|---|---|---|---|---|---|---|
| OIL PATH c | x | x | x | O | O | O |
| OIL PATH d | x | x | x | x | O | O |
| OIL PATH e | x | x | x | x | x | O |
| OIL PATH f | x | O | x | x | x | x |

(a) When the manual valve 107 is set to D

As shown in Table 1, oil path b is connected to oil path c, so that the line pressure is supplied to clutch C-1 and clutch C-1 engages. When traveling in the 1st speed range, solenoid valve 129 is ON and solenoid valve 130 is OFF, the spool 150 of the 1-2 shift valve is forced to the left, the oil paths g and h, connected to brakes B-1, B-2, are discharged and the brakes B-1, B-2, B-3 are disengaged as no oil pressure is supplied to oil path g which is connected to the brake B-3.

When the vehicle speed exceeds a preset value, the computer output energizes the solenoid valve 130; the solenoid pressure in oil path j, which is the 1-2 shift valve 110 control pressure, drops low and the spool 150 of the 1-2 shift valve 110 is forced to the right, so that oil pressure is supplied through oil path c, the 1-2 shift valve 110 and oil path h, to engage the brake B-2 to select the 2nd gear range. At this time, the spool 151 of the 3-4 shift valve 111 is held in its right position by the oil pressure in oil path k, so that it is in the 3rd gear position, regardless of the connection of solenoid valve 130.

The 3rd gear range is selected when the vehicle speed and throttle setting reach prescribed values and the computer output energizes the solenoid valve 130; the spool 152 of the 3-4 shift valve 109 moves to the left, so that oil pressure is supplied through oil path b, the 2-3 shift valve 109 and oil path m, to engage the clutch C-2. At the same time, the spool 150 of the 1-2 shift valve 110 is held in the right position (2nd, 3rd and 4th gear position) by the line pressure supplied via oil path h.

As for the 4th gear range selection, the 4th gear range selection occurs when the computer output turns off the solenoid valve 130, so that the pressure in the oil path j rises to its high level, forcing the spool 151 of the 3-4 shift valve 111 to the left, so that pressure is discharged from oil path n, pressure is supplied to oil path p, causing brake B-4 to release and clutch C-3 to engage.

(b) When the manual valve 107 is set to S

As shown in Table 1, line pressure is connected to oil path d as well as oil path c. In this case, 1st, 2nd and 3rd, gear range selection is possible, as for the case where "D" is selected with the shift lever, but pressure is applied through oil path b, 2-3 shift valve 109 and oil path k to the 3-4 shift valve 111 and holds the spool 151 in the right position, so that the 4th gear range cannot be selected.

In addition, if the manual valve 107 is manually shifted from the "D" position to the "S" position when traveling in 4th gear range, line pressure is applied to the left end of spool 151, so that 3rd gear is immediately selected. However, when the vehicle speed drops to a preset value, the computer output turns on the solenoid valve 129 and the 2nd gear range is selected. At this time, the second coast modulator pressure is applied to the brake B-1 through the oil path d, the 2-3 shift valve 109, the oil path r, the second coast modulator valve 113, 1-2 shift valve 110 and the oil path g, so that brake B-1 lightly engages, producing a slight engine-braking effect while traveling in 2nd gear.

(c) When the manual valve 107 is set to L

As shown in Table 1, line pressure is connected to oil path e as well as oil paths c and d. In this case, the 2nd gear range operates as when the manual valve 107 selects "D", but spool 152 of the 2-3 shift valve 109 is held in the right-hand position. The low coast modulator pressure is applied to the brake B-3 through the oil path e, the 2-3 shift valve 109, the oil path s, the low coast modulator valve 112, the oil path t, the 1-2 shift valve 110 and the oil path i, so that brake B-3 engages, and 1st gear with effective engine-braking is selected.

If "L" is selected when traveling in 3rd gear range, line pressure is applied to the left end of spool 152 via the oil path e, as described above, and the solenoid valve 129 is energized, causing an immediate shift down to 2nd gear. Subsequently, when the vehicle speed drops to a preset value, the computer output energizes the solenoid valve 130 to select the 1st gear with effective engine brake.

(d) When the manual valve 107 is set to N or P

As shown in Table 1, line pressure is not connected to oil paths c, d, e or f, the solenoid valve 129 is ON and the solenoid valve 130 is OFF. Line pressure from oil path j acts on the right lands of the 1-2 shift valve 110 and 3-4 shift valve 111, so that spool 150 is forced to the left (1st gear) end and line pressure from oil path b, the 2-3 shift valve 111, and oil path k is applied to the left land of spool 151, forcing it to the right (1st and 3rd gear) end. As a result, line pressure is applied through the oil path b, the 3-4 shift valve 111 and the oil path n, causing only the brake B-4 to engage, setting the neutral position.

(e) When the manual valve 107 is set to R

Oil paths b and f are connected and oil paths d and e are discharged, the solenoid valve 129 is ON and the solenoid valve 130 is OFF. The spool 152 of the 2-3 shift valve 109 is forced to the right end, oil paths m and k are both at line pressure so that spool 150 and spool 151 of the 1-2 shift valve 110 and 3-4 shift valve 111, respectively, are both held in the right hand position, so that clutch C-2, brake B-3 and brake B-4 all engage, selecting reverse gear.

The hydraulic control circuit of the lockup clutch 131, related to the invention, is described hereafter.

When the manual valve 107 is in one of the D, S, or L positions, line pressure exists in the oil path c, and, in the case whereby the 1-2 shift valve 110 is in the 2nd gear range position, line pressure rising in the oil path h is applied to the lockup modulator valve 115. Oil, which has been pressure-regulated by the lockup modulator valve 115, is controlled to a prescribed pressure by the solenoid valve 127 and supplied to the lockup control valve 116 through the oil path u. However, the secondary pressure is also supplied to the lockup control valve 116 from the secondary regulator valve 103 via the oil path v. Pressure-regulated oil from the lockup control valve 116 is sent to both sides of the lockup clutch 131 inside the torque converter T via oil paths x and y, to control the torque converter to operate in one of the torque converter region, slip region (semi-engaged) and lockup region, using the control method described hereafter.

The operation of the hydraulic control circuits are summarized in Table 2 on the following page.

TABLE 2

|   |   | Solenoid | | | Clutch | | | Brake | | | | One-way Clutch | | |
|---|---|---|---|---|---|---|---|---|---|---|---|---|---|---|
|   |   | S$_1$ | S$_2$ | S$_3$ | C$_1$ | C$_2$ | C$_3$ | B$_1$ | B$_2$ | B$_3$ | B$_4$ | F$_1$ | F$_2$ | F$_3$ |
| P |   | ○ | × | × | × | × | × | × | × | × | ○ | × | × | × |
| R |   | ○ | × | × | × | ○ | × | × | × | ○ | ○ | × | × | × |
| N |   | ○ | × | × | × | × | × | × | × | × | ○ | × | × | × |
| D | 1ST | ○ | × | × | ○ | × | × | × | × | × | ○ | ○ | △ | △ |
|   | 2ND | ○ | ○ | ○ | ○ | × | × | × | ○ | × | ○ | △ | × | △ |
|   | 3RD | × | ○ | ○ | ○ | ○ | × | × | ○ | × | ○ | × | × | △ |
|   | 4TH | × | × | ○ | ○ | ○ | ○ | × | ○ | × | × | × | × | × |
| S | 1ST | ○ | × | × | ○ | × | × | × | × | × | ○ | × | △ | △ |
|   | 2ND | ○ | ○ | ○ | ○ | × | × | ○ | ○ | × | ○ | △ | × | △ |
|   | 3RD | × | ○ | ○ | ○ | ○ | × | × | ○ | × | ○ | × | × | △ |
| L | 1ST | ○ | × | × | ○ | × | × | × | × | ○ | ○ | × | △ | △ |

TABLE 2-continued

|   |   | Solenoid | | | Clutch | | | Brake | | | | One-way Clutch | | |
|---|---|---|---|---|---|---|---|---|---|---|---|---|---|---|
|   |   | S$_1$ | S$_2$ | S$_3$ | C$_1$ | C$_2$ | C$_3$ | B$_1$ | B$_2$ | B$_3$ | B$_4$ | F$_1$ | F$_2$ | F$_3$ |
|   | 2ND | ○ | ○ | × | ○ | × | × | ○ | ○ | × | ○ | △ | × | △ |

Table 2 shows solenoid valves S1, S2 and S3, which correspond to 129, 120 and 127 respectively. The symbol ○ indicates that a solenoid is ON, a clutch or brake is engaged, or a one-way clutch is locked. × indicates that a solenoid is OFF, a clutch or brake is disengaged, or a one-way clutch is free. ⊚ indicates that the lockup clutch can operate, and △ indicates that a one-way clutch is free when coasting and locked during engine drive.

Details of lockup clutch operation due to the invention are given hereafter.

Figure 1:
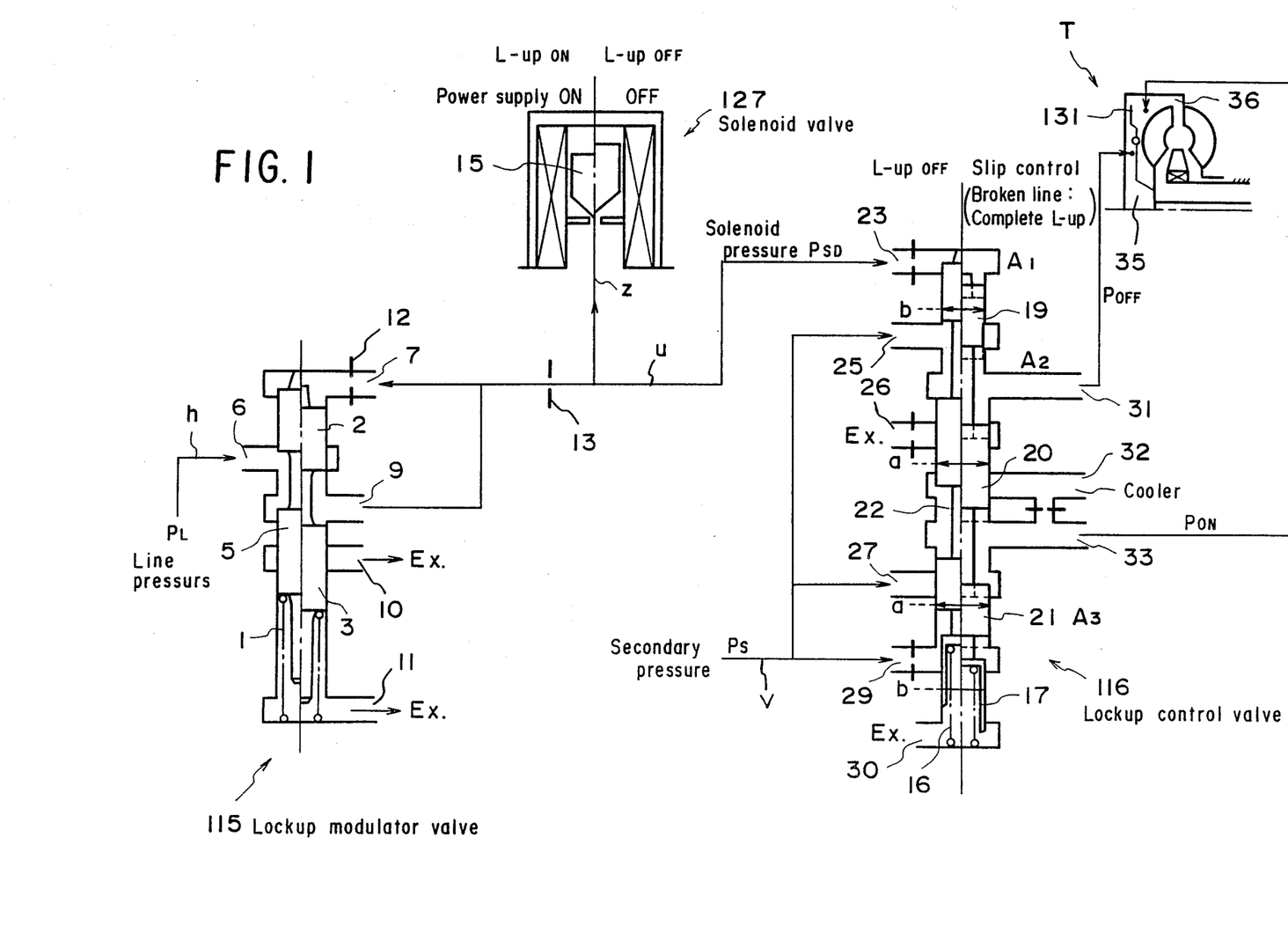
FIG. 1 shows an example of the application of the hydraulic controlling device of the invention.
Figure 2:
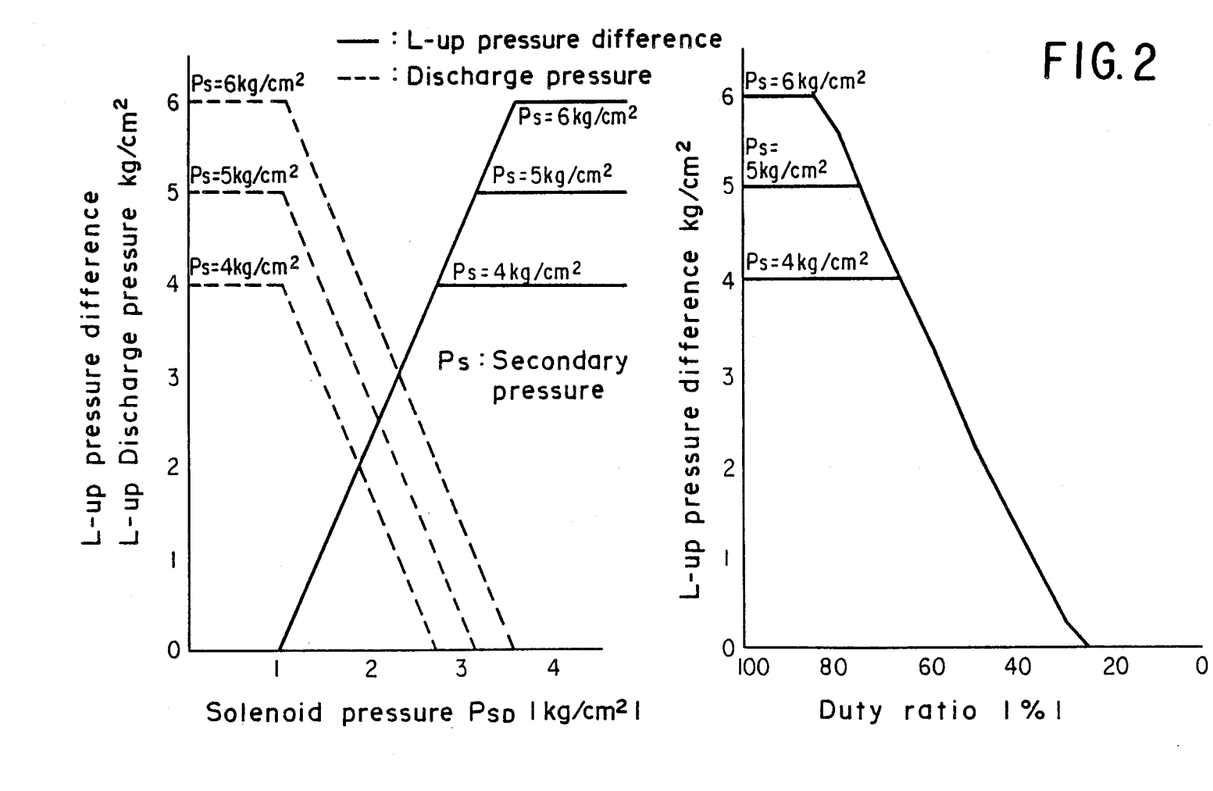
FIG. 2 graphically illustrates the oil pressure acting on the lockup clutch.

FIG. 1 shows an example of the application of the hydraulic controlling device of the invention; FIG. 2 graphically illustrates the oil pressure acting on the lockup clutch and FIG. 3, FIG. 4, FIG. 5 and FIG. 6 show other example applications of the hydraulic controlling device of the invention. In FIG. 1, 1 is a spring, 2, 3 are lands, 5 is a spool, 6, 7, 9, 10, 11 are ports, 12, 13 are orifices, 15 is a needle valve, 16 a spring, 17, 19 are small-diameter lands, 20, 21 are large-diameter lands, 22 is a spool, 23, 25, 26, 27, 29, 30, 31, 32, 33 are ports, 35 is the release chamber, 36 is the apply chamber, 115 is the lockup modulator valve, 116 is the lockup control valve, 127 is the solenoid valve, 131 the lockup clutch and T is the torque converter.

In the configuration in FIG. 1, the lockup modulator valve 115 has a spring on one side, the spool 5 with large-diameter lands 2, 3, and ports 6, 7, 9, 10 and 11. When the 1-b 2 shift valve is in the 2nd gear position, line pressure is supplied to port 6 via the oil path h. Oil from port 9 passes through the orifice 12 and is supplied to port 7, and pressure-controlled oil from the solenoid valve 127 in oil path u is also supplied to port 7 through orifice 13. Port 10 and port 11 are connected to the drain.

Solenoid valve 127 is the duty solenoid, which is controlled on and off by the computer according to the evaluation of whether the system is operating in the torque converter region, slip region, or lockup region. When an ON signal is input to solenoid valve 127, the needle valve 15 is forced out, closing off the drain circuit z; and conversely, when the control signal is OFF, the needle valve 15 is withdrawn, opening the drain circuit z. As a result, if the proportion of time that the 50 Hz ON-OFF control signal is ON (duty ratio) is increased, the time the drain circuit is closed increases, so that the line pressure in oil path u rises. Conversely, if the proportion of time that the signal is OFF is increased, the time the drain circuit is open increases and the line pressure in oil path u does not rise.

The lockup control valve 116 has a spool 22, which has the small-diameter land 17 with a spring 16 at one end and a small-diameter land 19 and large-diameter lands 20, 21 at the other end, and ports 23, 25, 26, 27, 29, 30, 31, 32, 33. The spool 22 is designed such that diameter b of each of the small-diameter lands 17, 19 is identical and the diameter of each of the large-diameter lands 20, 21 is identical. Pressure-controlled oil from the solenoid valve 127 is supplied to port 23 through oil path u. Secondary pressure from the secondary regulator valve 103 (FIG. 8) is supplied to ports 25, 27, 29; and port 26 and 30 are connected to the drain. Port 31 and port 33 are connected to the release chamber 35 and apply chamber 36 of the torque converter T, respectively. Port 32 is connected to an oil cooler (not illustrated).

The system operates as follows. When the vehicle is traveling in the 1st speed range, the 1-2 shift valve 110 (FIG. 8) is in the 1st gear position and the pressure in the oil path h is at the low level, such that the spool 5 of the lockup modulator valve 115 is moved up, as shown by the left half position of spool 5 in FIG. 1, by the force of the spring 1, fully connecting port 6 to port 9. No pressure is then supplied to port 23 of the lockup control valve 116, so that spool 22 of the lockup control valve 116 is moved up, as shown by the left half position of spool 22 in FIG. 1, by the force of the spring 16. As a result, the secondary pressure output from the secondary regulator valve 103 flows in order through port 25, port 31, release chamber 35, apply chamber 36, port 33, port 32 to the oil cooler. The lockup clutch 131 disengages and the engine power is transmitted through the torque converter, so that the vehicle is traveling in the torque converter region.

When the vehicle is traveling in the 2nd, or higher, speed range, the 1-2 shift valve 110 is in the 2nd gear position and the line pressure in the oil path h is supplied to port 6 of the lockup modulator valve 115. This pressure moves the spool 5 down, as shown in the right half position of spool 5 FIG. 1, against the action of the spring 1, such that the connection between port 6 and port 9 is slightly open and regulates the pressure. Pressure from oil path h is also supplied to the port 7 through the orifice 12, so that if the line pressure fluctuates, the spool 5 moves to adjust the pressure supplied to the solenoid valve 127 to a constant value of approximately 4 kg/cm². This constant pressure is supplied to port 23 of the lockup control valve 116 through port 6, port 9 and oil path u and also to the solenoid valve 127 through the oil path z. The oil pressure applied to port 23 of the lockup control valve 116 depends on the solenoid valve 127 duty ratio (the proportion of time that the ON-OFF signal is ON), and if this pressure exceeds a prescribed value, it overcomes the force of spring 16 and moves down, as shown in the right half position of the spool 22 in FIG. 1.

The solid lines in FIG. 1 illustrate the positions when the lockup clutch 131 is in the slip (semi-engaged) condition. The pressure in the release chamber 35 is regulated in accordance with the solenoid pressure from the solenoid valve 127, by using the secondary pressure supplied through port 25 and port 31 and the discharged oil pressure via port 31 and port 26. That is, the lockup control valve 116 makes high-frequency reciprocating oscillations, determined by the balance of the valve, so that port 31 is intermittently connected and disconnected to 25 or 26 to control the discharge pressure from the lockup clutch according to the solenoid pressure.

If the solenoid pressure supplied to port 23 increases, the spool 22 moves to the position indicated by a broken line in the FIG. 1 and the secondary pressure is supplied to the apply chamber 36 through the port 33 and the oil in the release chamber 35 is fully discharged through the port 31 and port 26, so that the lockup clutch 131 engages and the system operates in the lockup region.

A feature of this invention is the lockup control valve construction to maintain a constant pressure difference across the lockup clutch (hereafter, lockup clutch pressure difference) PLUP (determined by the solenoid pressure PSD) even if the secondary pressure PS fluctuates. That is, if the area of land 19 on which the solenoid pressure acts is A1, the area between land 19 and land 20 on which the discharge pressure acts is A2, the area between land 17 and land 21 on which the secondary pressure acts is A3, the lockup clutch discharge pressure is POFF and the spring force is FS, then:

$$P_{SD} \cdot A_1 + P_{OFF} \cdot A_2 = F_S + P_S \cdot A_3 \qquad (1)$$

$$P_{OFF} = (F_S + P_S \cdot A_3 - P_{SD} \cdot A_1)/A_2 \qquad (2)$$

$$P_{LUP} = P_S - P_{OFF} = (A_2 - A_3) \cdot P_S/A_2 + \qquad (3)$$

$$(P_{SD} \cdot A_1 - F_S)/A_2$$

If area A2=A3, then from equation (3), we see that the lockup clutch pressure difference PLUP is independent of the secondary pressure, and is entirely determined by the solenoid pressure PSD and the spring force FS. (However, PLUP<PS). Consequently, from equation (1) we get:

$$P_{SD} \cdot A_1 + P_{OFF} \cdot A_2 = F_S + P_S \cdot A_2$$

and if the lockup clutch moves to the full release position if PSD<1 kg/cm², then:

$$1 \cdot A_1 + P_S \cdot A_2 = F_S + P_S \cdot A_2 \text{ i.e., } F_S = A_1 \qquad (4).$$

Also, the lockup clutch moves to the full engage position if PS=6 kg/cm² and PSD>3.5 kg/cm², then:

$$3.5 A_1 + 0 = F_S + 6 \cdot A_2 \qquad (5)$$
$$\text{i.e., } 3.5 A_1 = F_S + 6 \cdot A_2$$

Furthermore, if the maximum diameter of the valve is set at 11 mm, then:

$$A_1 + A_2 = \pi \cdot (1.1)^2/4 \qquad (6)$$

Substituting (4) into (6) in the equations (5), we get:

$$3.5 A_1 = 6 \cdot (\pi \cdot (1.1)^2/4 - A_1) + A_1$$
$$\text{i.e., } 8.5 A_1 = 3\pi \cdot (1.1)^2/2$$
$$\text{i.e., } A_1 = 0.6708 \text{ cm}^2, A_2 = A_3 =$$
$$0.2795 \text{ cm}^2, F_S = 0.6708 \text{ kg}$$

Substituting the values above into (2) and (3), we get the relationship between the solenoid pressure PSD, the lockup clutch discharge pressure POFF and the lockup clutch pressure difference PLUP:

$$P_{OFF} = (0.6708 + 0.2795 P_S -$$
$$0.6708 P_{SD})/0.2795$$
$$P_{LUP} = P_S - P_{OFF}$$
$$= (0.6708 P_{SD} - 0.6708)/$$
$$= 0.2795$$

Referring to FIG. 2 it can be seen that even if the solenoid valve 127 is fully open, a residual pressure of 0.3–0.5 kg/cm² exists at port 23, so that if the solenoid pressure PSD is less than approximately 1 kg/cm², the spool 22 is maintained in the left position by the spring 16, and the lockup clutch is fully disengaged.

If the solenoid pressure PSD is in the 1-3.5 kg/cm² range, the lockup discharge pressure is maintained between 0-6 kg/cm², determined by the balance of the solenoid pressure PSD, the lockup clutch discharge pressure POFF, the lockup clutch supply pressure PON and the spring force FS, and the spool 22 is maintained at the position shown in solid lines in FIG. 1.

If the solenoid pressure is in the 3.5-4 kg/cm² range, the solenoid pressure PSD overcomes the lockup supply pressure PON and spring force FS and the spool 22 is forced to the down position, shown in broken lines in FIG. 1, so that the clutch is fully engaged. It can be seen, therefore, that a constant relationship is maintained between the lockup clutch pressure difference PLUP and the solenoid pressure PSD, if the secondary pressure fluctuates in the range 4-6 kg/cm².

Figure 3:
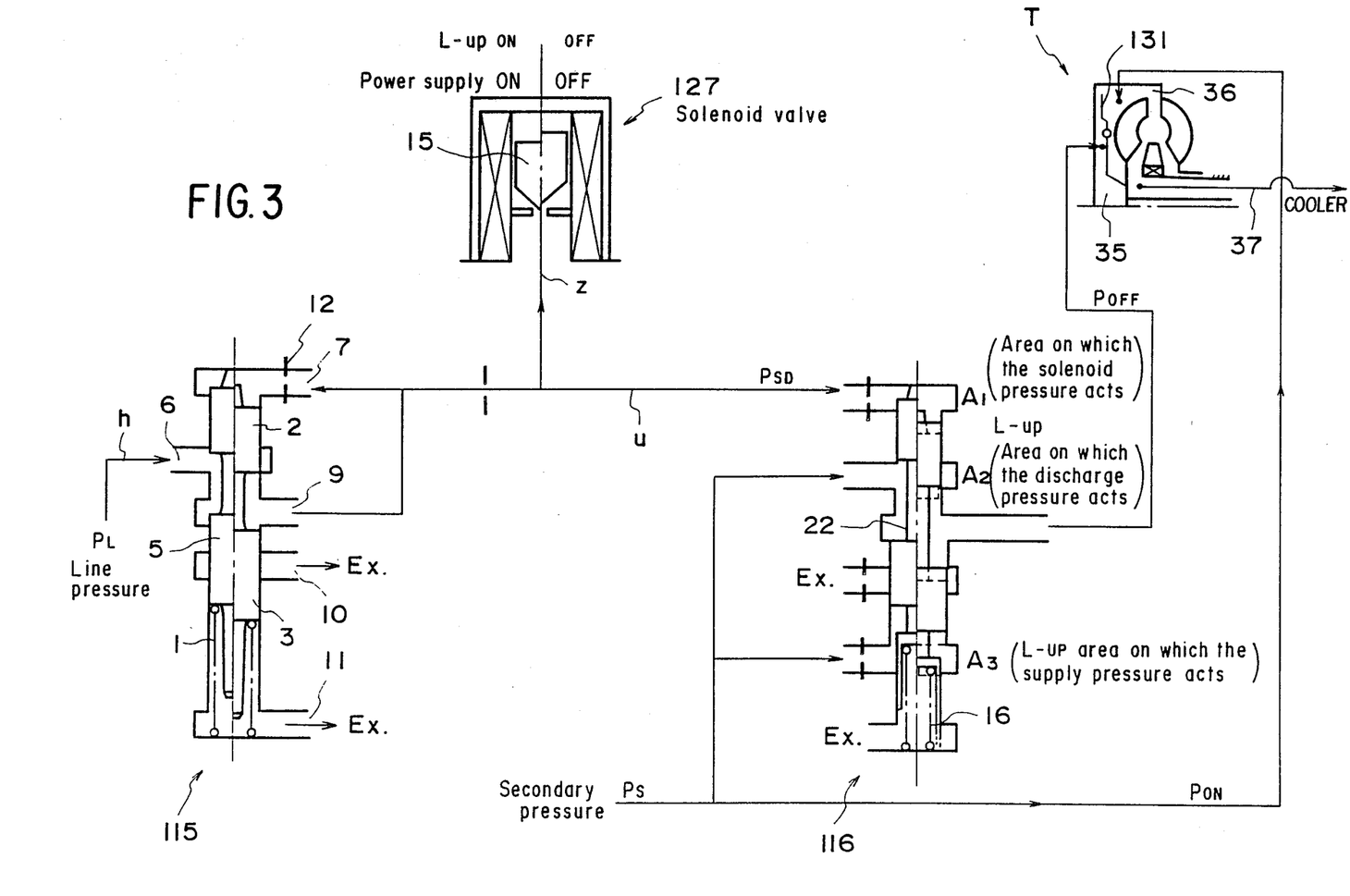
FIG. 3, FIG. 4, FIG. 5 and FIG. 6 show other example applications of the hydraulic controlling device of the invention.

FIG. 3 shows another example of an application of the invention. This example differs from the example in FIG. 1 in that the oil path 37 is connected to the apply chamber 36 in the torque converter T. When operating in the torque converter region, oil flows from the apply chamber 36 through the oil path 37 to the oil cooler. As a result, no switching device on the lockup control valve 116 is required; the secondary pressure is applied directly to the apply chamber 36 in the torque converter T; and when the lockup clutch 131 is disengaged, oil is discharged from the apply chamber 36 through the oil path 37.

Figure 4:
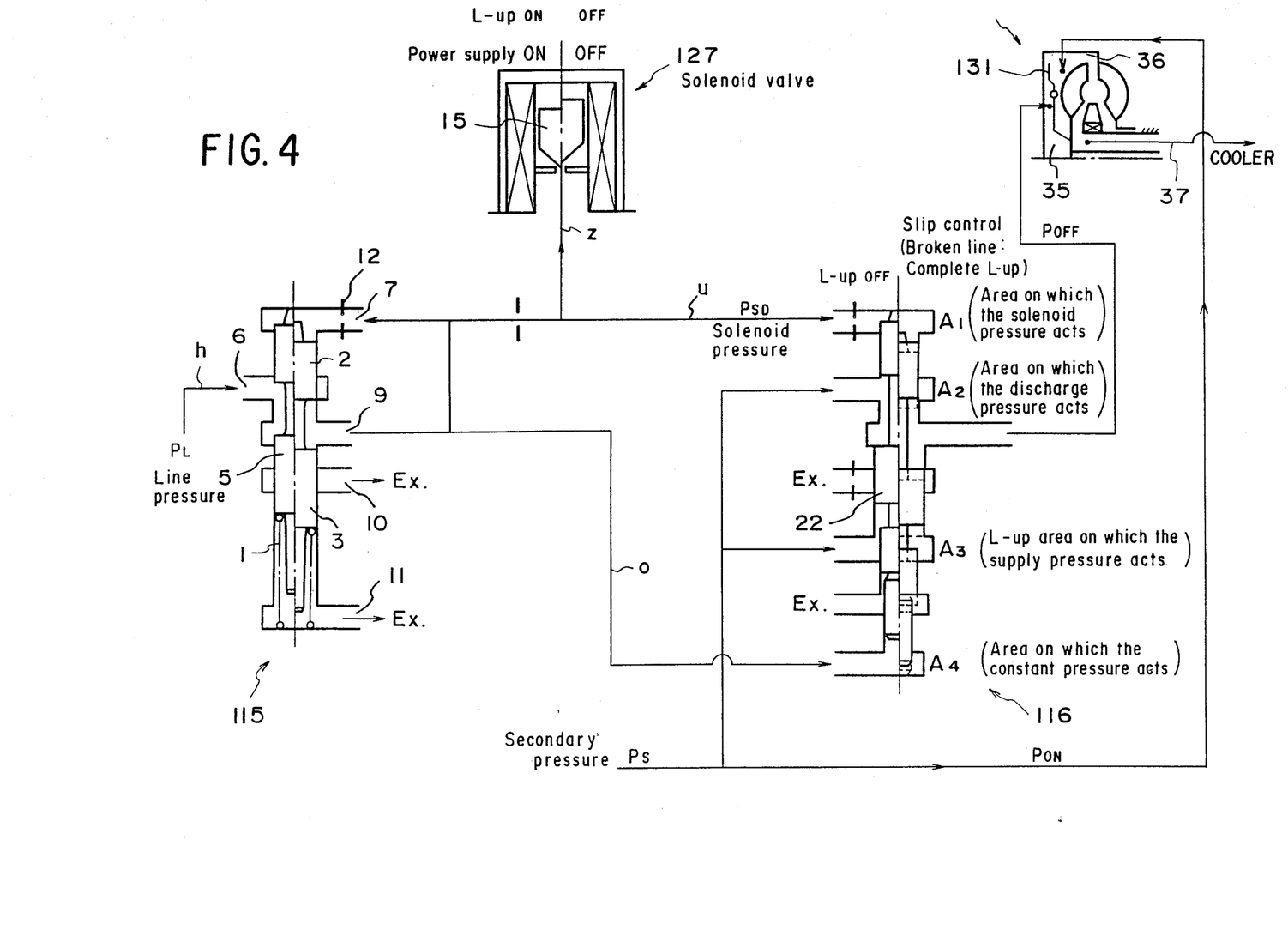

The example application shown in FIG. 4 differs from that in FIG. 3 in that the spring in the lockup control valve 116 has been eliminated and a constant pressure supply through the oil path o has been provided from the lockup modulator valve 115. In this application, the area of the face on which the lockup discharge pressure acts A2, and that on which the lockup supply pressure act are equal, but the area on which the solenoid pressure acts A1>the area on which the constant pressure acts A4. The spring has been eliminated in this application but, of course, it is possible to use the spring.

Figure 5:
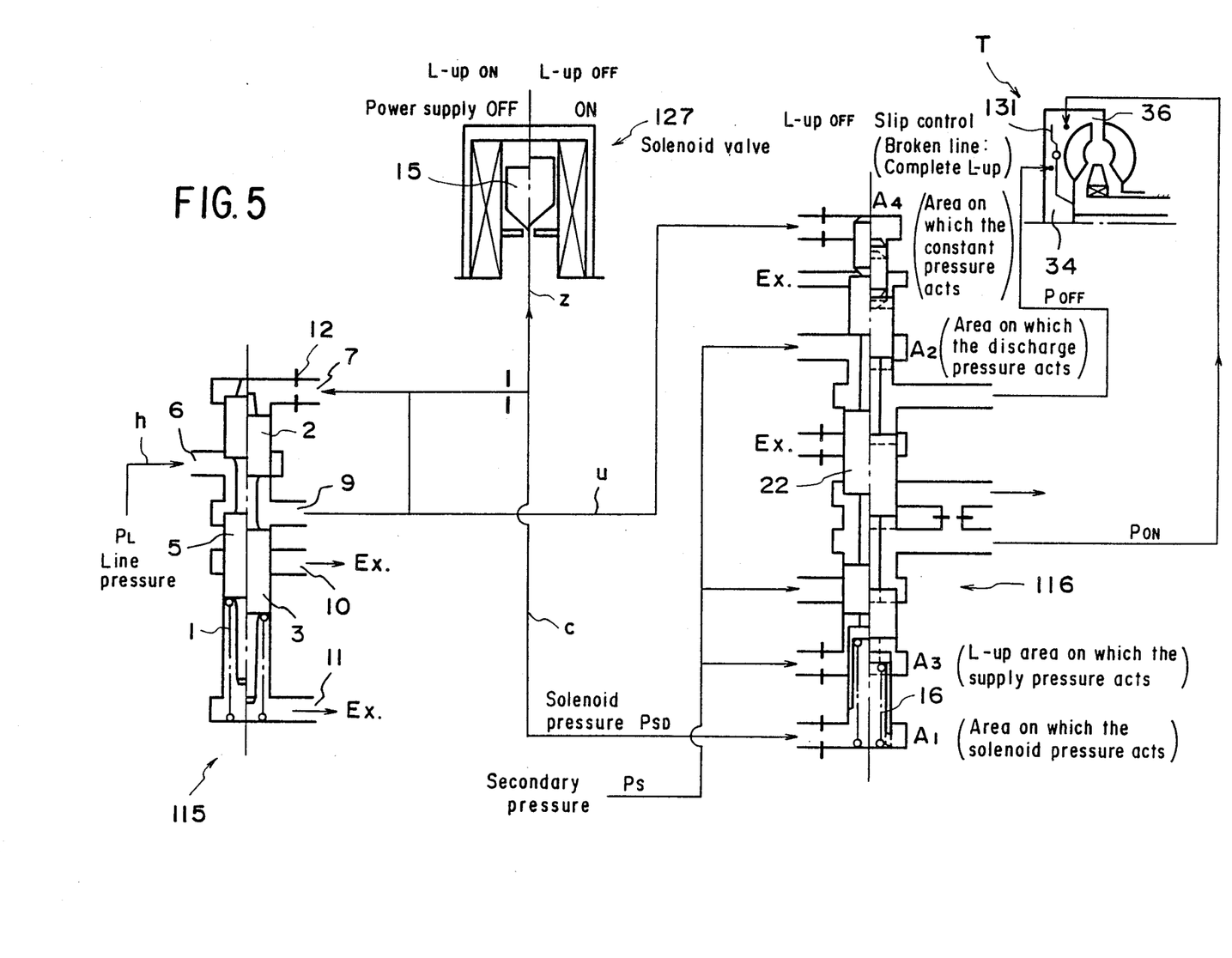

FIG. 5 shows another example application of the invention, which differs from that shown in FIG. 1 in that the position of the lockup control valve 116 to which the solenoid pressure is applied is reversed, so that the oil is supplied from the solenoid valve 127 throught the oil path c, to act in the same direction as the spring 16. The constant pressure from the lockup modulator valve 115 through oil path u is applied to the opposing end of the spool 22. The system is arranged such that the needle valve 15 is forced out when the solenoid valve 127 power is OFF. It is also arranged such that the lockup clutch 131 disengages if the solenoid valve 127 power is OFF for a long time.

Figure 6:
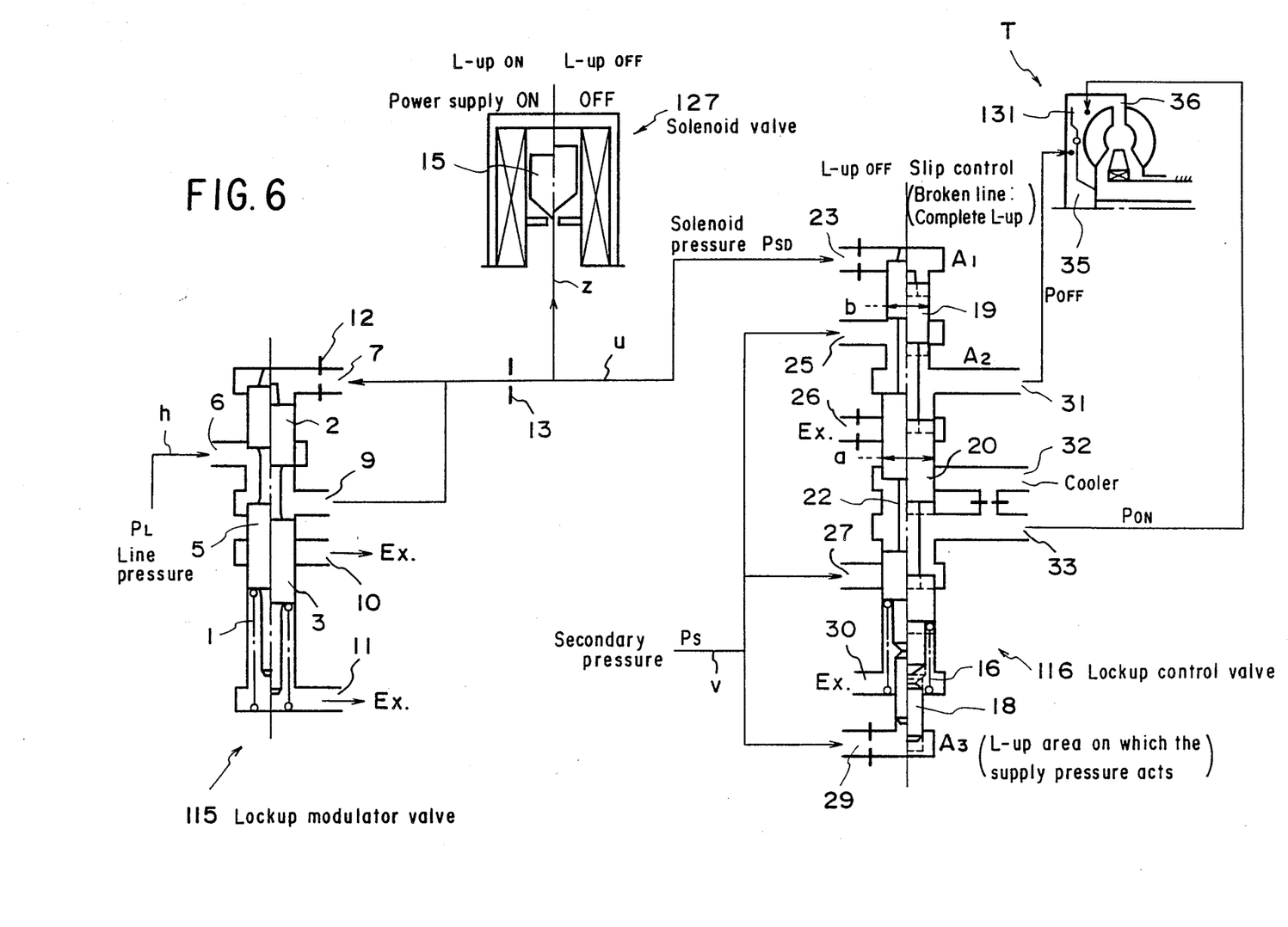

FIG. 6 shows one more example application of the invention, which differs from that shown in FIG. 1 in that, whereas the area on which the lockup supply pressure acts A3 in the arrangement shown in FIG. 1 is a stepped area which is integral with the spool 22, in this arrangement the lockup supply pressure acts on the area A3 of the bottom end of a plunger 18, separate from the spool 22. This helps prevent valve sticking and simplifies manufacture of the spool.

Application of the invention is not limited to the examples listed above, and a wide range of variations is possible. For example, the control system using the duty ratio of the on-off signal of the solenoid 127 could be replaced with a linear type solenoid.

As explained above, the invention maintains a constant relationship between the solenoid pressure and the lockup clutch capacity (pressure difference), so that precise slip control is possible even if the pressure of the oil supply to the lockup clutch fluctuates. Furthermore, the control device is simplified and the cost reduced as no software compensation of the pressure supplied to the lockup clutch is required. Also, the lockup supply pressure may be reduced when the engine is operating under low-load conditions, which is structurally advantageous to the torque converter, and the reduced oil-pump drive power contributes to improving vehicle fuel consumption. The good matching of the solenoid duty ratio and lockup capacity permits transmission slip control to prevent shock control and busy shift protection, without complex feedback control.

What is claimed is:

1. A hydraulic control system for a lockup clutch comprising:

an oil pressure supply source;

regulator means for providing a secondary oil pressure;

a fluid coupling hydraulically transmitting an engine power to an automatic transmission;

a lockup clutch disposed in the fluid coupling, the lockup clutch defining an apply chamber and a release chamber;

a lockup control valve for controlling an amount of engagement of the lockup clutch by a pressure differential between oil pressure in the apply chamber and oil pressure in the release chamber, the lockup control valve having a spool biased by a constant pressure means with first, second, third and fourth oil chambers being formed by the spool;

a solenoid valve disposed in an oil path between the first oil chamber and the oil pressure supply source;

the second oil chamber connecting the release chamber to the secondary oil pressure and an exhaust port;

the third oil chamber connecting the apply chamber to the secondary oil pressure;

the fourth oil chamber being connected to the secondary oil pressure; and each of the second and fourth oil chambers having a pressure-receiving face, the second chamber pressure-receiving face and the fourth chamber pressure-receiving face having identical surface areas and respectively acting in a direction of the constant pressure means and a direction opposite thereto.

2. A hydraulic control system for a lockup clutch as claimed in claim 1, wherein the constant pressure means is at least one of a spring and oil pressure from the oil pressure supply source.

3. A hydraulic control system for a lockup clutch as claimed in claim 1, wherein the constant pressure means is a spring disposed in the fourth oil chamber.

4. A hydraulic control system as claimed in claim 1, wherein the pressure-receiving faces are arranged to maintain a constant pressure differential across the lockup clutch so that, during slip control, action of the second chamber pressure-receiving face in the direction of constant pressure means less engagement of the lockup clutch and action of the fourth chamber pressure-receiving face in the direction opposite of the constant pressure means causes more engagement of the lockup clutch.

5. A hydraulic control system as claimed in claim 4, wherein the secondary oil pressure provides oil under equal pressure to the second and fourth chambers.

6. A hydraulic control system as claimed in claim 1, wherein each of the second and fourth oil chambers have an additional pressure-receiving face, the fourth chamber additional pressure-receiving face and the second chamber additional pressure-receiving face having identical surface areas and respectively acting in the direction of the constant pressure means and the direction opposite thereto.

7. A hydraulic control system for a lockup clutch comprising:
   an oil pressure supply source;
   regulator means for supplying secondary oil pressure;
   a fluid coupling for hydraulically transmitting an engine power to an automatic transmission;
   a lockup clutch disposed in the fluid coupling, the lockup clutch defining an apply chamber and a release chamber;
   a lockup control valve for controlling an amount of engagement of the lockup clutch by a pressure differential between oil pressure in the apply chamber and oil pressure in the release chamber, the lockup control valve having a spool biased by a constant pressure means with first, second and third oil chambers being formed by the spool;
   a solenoid valve disposed in an oil path between the first oil chamber and the oil pressure supply source;
   the second oil chamber connecting the release chamber to the secondary oil pressure and an exhaust port;
   the third oil chamber being connected to the secondary oil pressure; and
   each of the second and third oil chambers having a pressure-receiving face, the second chamber pressure-receiving face and the third chamber pressure-receiving face having identical surface areas and respectively acting in a direction of the constant pressure means and a direction opposite thereto during slip control.

8. A hydraulic control system for a lockup clutch as claimed in claim 7, wherein the constant pressure means is at least one of a spring and oil pressure from the oil pressure supply source.

9. A hydraulic control system for a lockup clutch as claimed in claim 7, wherein the constant pressure is a spring disposed in the first oil chamber.

10. A hydraulic control system as claimed in claim 7, wherein each of the second and third oil chambers have an additional pressure-receiving face, the third chamber additional pressure-receiving face and the second chamber additional pressure-receiving face having identical surface areas and respectively acting in the direction of the constant pressure means and the direction opposite thereto.

11. A hydraulic control system as defined in claim 7 wherein the apply chamber defined by the lockup clutch is directly coupled to the secondary oil pressure.

12. A hydraulic control system for a lockup clutch comprising:
   an oil pressure supply source;
   regulator means for supplying secondary oil pressure;
   a fluid coupling for hydraulically transmitting an engine power to an automatic transmission;
   a lockup clutch disposed in the fluid coupling, the lockup clutch defining an apply chamber and a release chamber;
   a lockup control valve for controlling an amount of engagement of the lockup clutch by a pressure differential between oil pressure in the apply chamber and oil pressure in the release chamber, the lockup control valve having a spool biased by a constant pressure means with first, second and third oil chambers being formed by the spool;
   a solenoid valve disposed in an oil path between the first oil chamber and the oil pressure supply source;
   the second oil chamber connecting the release chamber to the secondary oil pressure and an exhaust port;
   the third oil chamber being connected to the secondary oil pressure; and
   each of the second and third oil chambers having a pressure-receiving face, the second chamber pressure-receiving face and the third chamber pressure-receiving face having identical surface areas and respectively acting in a direction of the constant pressure means and a direction opposite thereto,
   wherein the pressure-receiving faces are arranged to maintain a constant pressure differential across the lockup clutch so that, during slip control, action of the second chamber pressure-receiving face in the direction of constant pressure means causes less engagement of the lockup clutch and action of the third chamber pressure-receiving face in the direction opposite of the constant pressure means causes more engagement of the lockup clutch.

13. A hydraulic control system as claimed in claim 12, wherein the secondary oil pressure provides oil under equal pressure to the second and third chambers.

* * * * *